United States Patent
Sakuma et al.

(10) Patent No.: US 11,695,473 B2
(45) Date of Patent: Jul. 4, 2023

(54) TIME COMPARISON SYSTEM, TIME COMPARISON DEVICE, AND TIME COMPARISON METHOD

(71) Applicant: Nippon Telegraph and Telephone Corporation, Tokyo (JP)

(72) Inventors: Hiroki Sakuma, Musashino (JP); Kaoru Arai, Musashino (JP); Ryuta Sugiyama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 127 days.

(21) Appl. No.: 17/441,897

(22) PCT Filed: Apr. 6, 2020

(86) PCT No.: PCT/JP2020/015480
§ 371 (c)(1),
(2) Date: Sep. 22, 2021

(87) PCT Pub. No.: WO2020/213445
PCT Pub. Date: Oct. 22, 2020

(65) Prior Publication Data
US 2022/0021448 A1 Jan. 20, 2022

(30) Foreign Application Priority Data
Apr. 17, 2019 (JP) ................... 2019-078875

(51) Int. Cl.
*H04B 10/07* (2013.01)
*H04B 10/071* (2013.01)
(Continued)

(52) U.S. Cl.
CPC ............ *H04B 10/071* (2013.01); *G04G 5/00* (2013.01); *H04B 10/079* (2013.01); *H04B 10/503* (2013.01); *H04L 7/0075* (2013.01)

(58) Field of Classification Search
CPC .. H04B 10/071; H04B 10/079; H04B 10/503; H04L 7/0075
See application file for complete search history.

(56) References Cited

U.S. PATENT DOCUMENTS

2017/0195836 A1* 7/2017 Zhang ................... G01S 5/0236
2020/0008197 A1* 1/2020 Li ......................... H04L 25/022
(Continued)

OTHER PUBLICATIONS

Allan et al., "Accurate time and frequency transfer during common-view of a GPS satellite," 34th Annual Frequency Control Symposium, May 1980, pp. 334-336.
(Continued)

*Primary Examiner* — Dzung D Tran
(74) *Attorney, Agent, or Firm* — Fish & Richardson P.C.

(57) ABSTRACT

[Problem] To determine a time difference between clocks which, for example, are placed far apart from each other with high accuracy at low cost.
[Solution] In a time comparison system 20, an intermediate station 21 disperses a single optical signal 21$c$ in the spatial region using the optical complex amplitude modulation to simultaneously transmit the optical signal 21$c$ to a plurality of comparative stations 22 and 23 apart from each other. The intermediate station 21 transmits the optical signal 21$c$ while changing the transmission angle using phase modulation, performs intensity scanning for the reflected light c1 of the optical signal 21$c$, and detects the peak intensity to determine the directions of the comparative stations 22 and 23. The reflected light c1 of the optical signal 21$c$ transmitted to the comparative stations 22 and 23 of which the direction have been determined, is detected to determine a round-trip propagation delay time between the intermediate station 21 and each of the comparative stations 22 and 23. The difference calculation unit 25 calculates a sum of time difference between each of times ta and tb associated with the com-
(Continued)

parative stations 22 and 23 and the time tc associated with the intermediate station 21, and the determined propagation delay time to determine time information of each of the comparative stations 22 and 23. Based on the result of subtracting, from the time information of the comparative stations 22, the time information of the comparative stations 23, the time difference between the comparative stations 22 and 23 is determined.

18 Claims, 11 Drawing Sheets

(51) Int. Cl.
*G04G 5/00* (2013.01)
*H04B 10/079* (2013.01)
*H04B 10/50* (2013.01)
*H04L 7/00* (2006.01)

(56) References Cited

U.S. PATENT DOCUMENTS

2020/0041603 A1* 2/2020 Stephens .................. G01S 5/12
2022/0278747 A1* 9/2022 Sugiyama ................. H04B 1/40
2022/0352987 A1* 11/2022 Horishita ........... H04B 10/5057

OTHER PUBLICATIONS

Sliwczynski et al., "Fiber Optic Time Transfer for UTC-Traceable Synchronization for Telecom Networks," IEEE Communications Standards Magazine, 2017, 1(1):1-8.

* cited by examiner

TIME COMPARISON SYSTEM, TIME COMPARISON DEVICE, AND TIME COMPARISON METHOD

CROSS-REFERENCE TO RELATED APPLICATIONS

This application is a National Stage application under 35 U.S.C. § 371 of International Application No. PCT/JP2020/015480, having an International Filing Date of Apr. 6, 2020, which claims priority to Japanese Application Serial No. 2019-078875, filed on Apr. 17, 2019. The disclosure of the prior application is considered part of the disclosure of this application, and is incorporated in its entirety into this application.

TECHNICAL FIELD

The present disclosure relates to a time comparison system, a time comparison apparatus, and a time comparison method for highly accurately determining a time difference by time comparison between clocks which, for example, are placed far apart from each other, in a wide range of technical fields including communication technology, measurement technology, power technology, and scientific technology.

BACKGROUND ART

To perform a process for achieving time synchronization between clocks which, for example, are placed far apart from each other, for example, it is required to compare times of the clocks with each other to highly accurately determine the time difference. For example, it can be assumed that there is a case where, for buildings 1a and 1b far apart from each other, a difference between time ta of a clock 2a in the building 1a and time tb of a clock 2b in the building 1b is to be highly accurately measured and determined, as illustrated in FIG. 9. In this case, a difference calculation unit 3 is used to perform comparison between the time ta and the time tb, in which the time tb is subtracted from the time ta to determine the time difference Δt. Then, as indicated by an arrow Y1, the time tb of the clock 2b is shifted by the time difference Δt to achieve correction for synchronizing the time tb with the time ta of the clock 2a.

Representative examples of the time comparison system that compares times of clocks apart from each other to highly accurately determine a time difference, as described above, include Optical Time Transfer (OTT) system using an optical fiber and Global Positioning System-Common View (GPS-CV) using GPS.

FIG. 10 is a block diagram of a configuration of an OTT system 1. The OTT system 1 includes the clocks 2a and 2b far apart from each other, optical time transfer apparatuses 4 and 5 connected by an optical fiber 6, and a Time Interval Counter (TIC) 7. The optical time transfer apparatuses 4 is located near the clock 2a, and the optical time transfer apparatus 5 is located near the clock 2b, together with the TIC 7.

The clock 2a is connected to the optical time transfer apparatus 4, and the optical time transfer apparatus 5 is connected to the optical time transfer apparatus 4 via the optical fiber 6 extending for a long distance. The optical time transfer apparatus 5 is connected to the clock 2b via the TIC 7.

In such a configuration, a time signal based on the time ta of the clock 2a is transmitted from the optical time transfer apparatus 4 to the remote optical time transfer apparatus 5 via the optical fiber 6. Propagation delay occurs in the optical fiber 6 and the like between the optical time transfer apparatuses 4 and 5, and such propagation delay is fluctuant. However, the optical time transfer apparatuses 4 and 5 performs processing for compensating such fluctuations to keep propagation delay time (also referred to as propagation delay) τ constant. Thus, the propagation delay τ is a constant known value.

The time ta of the time signal from the clock 2a received at the optical time transfer apparatus 5 is delayed by propagation delay τ, and a time signal for the delayed time ta+τ is input to the TIC 7. A time signal based on the time tb of the clock 2b is also input to the TIC 7.

Thus, the TIC 7 subtracts, from the time ta+delay τ based on the time signal of the clock 2a, time tb based on the time signal of the clock 2b to determine ta−tb+τ. τ is a known value, and thus the TIC 7 calculates ta−tb=time difference Δt by canceling τ using the same τ. The time tb of the clock 2b can be shifted by the time difference Δt to be synchronized with the time ta of the clock 2a.

FIG. 11 is a block diagram of a configuration of a GPS-CV system 10. The GPS-CV system 10 includes the clocks 2a and 2b far apart from each other, a GPS satellite 11, GPS antennas 12a and 12b, TICs 13a and 13b, and a difference calculation unit 15 connected via NWs (networks) 14a and 14b.

The GPS satellite 11 transmits a GPS signal (dashed arrow) on which a high accuracy time tg is superimposed. The GPS signal is received at each of the GPS antennas 12a and 12b. The distance between the GPS antenna 12a and the GPS satellite 11 is different from the distance between the GPS antenna 12b and the GPS satellite 11, and thus the propagation delay τa between the GPS antenna 12a and the GPS satellite 11 is different from and the propagation delay τb between the GPS antenna 12b and the GPS satellite 11.

Thus, the time tg of the GPS signal received at the GPS antenna 12a is delayed by the propagation delay τa, and the GPS signal for the delayed time tg+τa is input to the TIC 13a. A time signal based on the time ta of the clock 2a is also input to the TIC 13a. Thus, the TIC 13a subtracts, from the time ta of the clock 2a, the time tg of the GPS signal+delay τa to determine ta−(tg+τa). A time signal on which ta−(tg+τa) is superimposed is transmitted to the difference calculation unit 15 via the NW 14a.

Further, the time tg of the GPS signal received at the GPS antenna 12b is delayed by the propagation delay τb, and the GPS signal for the delayed time tg+τb is input to the TIC 13b. A time signal based on the time tb of the clock 2b is also input to the TIC 13b. Thus, the TIC 13b subtracts, from the time tb of the clock 2b, the time tg of the GPS signal+delay τb to determine tb−(tg+τb). A time signal on which tb−(tg+τb) is superimposed is transmitted to the difference calculation unit 15 via the NW 14b.

The difference calculation unit 15 subtracts, from ta−(tg+τa) superimposed on one of the time signals, tb−(tg+τb) superimposed on the other of the time signals. That is, {ta−(tg+Ta)}−{tb−(tg+τb)} is calculated to determine ta−tb+(τb−τa). As (τb−τa) is a known value, the difference calculation unit 15 calculates ta−tb=time difference Δt by canceling (τb−τa) by the same (τb−τa). The time tb of the clock 2b can be shifted by the time difference Δt to be synchronized with the time ta of the clock 2a, for example. These types of technology for determining a time difference Δt are disclosed in NPL 1 and NPL 2.

CITATION LIST

Non Patent Literature

NPL 1: L. Sliwczynski et al., "Fiber Optic Time Transfer for UTC-Traceable Synchronization for Telecom Networks," IEEE Commun. Standards Mag., 1(1), pp. 66-73, March 2017.

NPL 2: D. W. Allan and M. A. Weiss, "Accurate Time and Frequency Transfer During Common-view of a GPS Satellite," in Proc. 1980 Frequency Control Symp., pp. 334-336, May 1980.

SUMMARY OF THE INVENTION

Technical Problem

The above-described OTT system 1 can be used in any situation where the optical fiber 6 is laid, and thus can be introduced in a wide range of applications. However, the OTT system 1 occupies a dark fiber that is an unused optical fiber or a single core cable (one channel) of the optical fiber, resulting in increase in running cost. On the other hand, the GPS-CV system 10 can reduce running cost, but it can only be used in environments where the GPS signals to be received at the GPS antennas 12a and 12b are not affected by interference waves and disturbance waves. In other words, in the conventional time comparison systems, there is a problem in that a time difference between clocks which, for example, are placed far apart from each other cannot be determined with low cost and high accuracy.

The present invention has been made in view of such circumstances, and an object of the present disclosure is to provide a time comparison system, a time comparison apparatus, and a time comparison method allowing for determining a time difference between clocks which, for example, are placed far apart from each other with low cost and high accuracy.

Means for Solving the Problem

As a means for solving the above-described problems, an invention according to claim 1 is a time comparison system for determining a time difference between clocks each provided in one of a plurality of comparative stations apart from each other. The time comparison system includes an intermediate station including a clock and an optical antenna configured to transmit, to the plurality of comparative stations, an optical signal on which a time of the clock is superimposed and to receive reflected light of the optical signal. In the time comparison system, each of the plurality of comparative stations includes an optical antenna configured to transmit and receive an optical signal, a reflection unit configured to reflect, in a direction of the intermediate station, an optical signal from the intermediate station received by the optical antenna, and a measurement unit configured to determine a time difference between a time of the clock of the comparative station and the time superimposed on the optical signal from the intermediate station, and the intermediate station includes an intermediate function unit configured to transmit, to the plurality of comparative stations, the optical signal on which the time associated with the intermediate station is superimposed, while changing a transmission angle of the optical signal, detect a peak intensity of reflected light generated due to reflection of the transmitted optical signal on the reflection unit to determine a direction of each of the plurality of comparative stations, determine a propagation delay time between each of the plurality of comparative stations, of which the direction is determined, and the intermediate station, and simultaneously transmit an optical signal to the plurality of comparative stations at the transmission angle determined for each of the plurality of comparative stations. The time comparison system further includes a difference calculation unit configured to determine time information of each of the plurality of comparative stations by calculating a sum of the time difference between the time associated with the comparative station and the time associated with the intermediate station, that is determined by the measurement unit, and the propagation delay time determined by the intermediate function unit, and cancel, with the known propagation delay time, a propagation delay time included in a result of subtracting, from time information of one of the plurality of comparative stations, time information of another of the plurality of comparative stations, to determine a time difference between the plurality of comparative stations.

An invention according to claim 8 is a time comparison method in a time comparison system for determining a time difference between clocks each provided in one of a plurality of comparative stations apart from each other. In the method, the time comparison system includes an intermediate station including a clock and an optical antenna configured to transmit, to the plurality of comparative stations, an optical signal on which a time of the clock is superimposed and to receive reflected light of the optical signal, each of the plurality of comparative stations includes an optical antenna configured to transmit and receive an optical signal, a reflection unit configured to reflect, in a direction of the intermediate station, an optical signal from the intermediate station received by the optical antenna, and a measurement unit configured to determine a time difference between a time of the clock of the comparative station and the time superimposed on the optical signal from the intermediate station, and the time comparison system further includes a difference calculation unit configured to determine a time difference between the plurality of comparative stations. The method includes, at the intermediate station, transmitting, to the plurality of comparative stations, the optical signal on which the time associated with the intermediate station is superimposed, while changing a transmission angle of the optical signal, detecting a peak intensity of reflected light generated due to reflection of the transmitted optical signal on the reflection unit to determine a direction of each of the plurality of comparative stations, determining a propagation delay time between each of the plurality of comparative stations, of which the direction is determined, and the intermediate station, and simultaneously transmitting an optical signal to the plurality of comparative stations at the transmission angle determined for each of the plurality of comparative stations, and at the difference calculation unit, determining time information of each of the plurality of comparative stations by calculating a sum of the time difference between the time associated with the comparative station and the time associated with the intermediate station, that is determined by the measurement unit, and the determined propagation delay time, and canceling, with the known propagation delay time, a propagation delay time included in a result of subtracting, from time information of one of the plurality of comparative stations, time information of another of the plurality of comparative stations, to determine a time difference between the plurality of comparative stations.

With the configuration according to claim 1 and the method according to claim 8, each of the plurality of comparative stations far apart from each other, can wirelessly transmit and receive, to and from the intermediate station, the optical signal on which the time is superimposed, and the time difference between the plurality of comparative stations can be determined. The configuration for determining the time difference can be realized at a low cost because no optical fiber is used. Further, running costs can be reduced because no dedicated optical fiber is required. In addition, this configuration can accurately determine the time difference, because the time difference between the plurality of comparative stations can be determined by transmitting and receiving the optical signal. Thus, the time difference between clocks, for example, placed far apart from each other can be determined with high accuracy at low cost.

An invention according to claim 2 is the time comparison system according to claim 1, in which the intermediate function unit includes, a laser unit configured to emit a laser beam on which the time of the clock of the intermediate station is superimposed, a modulation unit configured to perform optical complex amplitude modulation on the laser beam to disperse spots of the laser beam in a spatial region, transmit, to the plurality of comparative stations, the optical signal subjected to the optical complex amplitude modulation, and change the transmission angle of the optical signal by performing phase modulation, during the optical complex amplitude modulation, on the laser beam, a control unit configured to perform intensity scanning for the reflected light generated due to reflection of the optical signal transmitted while changing a transmission angle on the reflection unit, detect a peak intensity to determine the direction of each of the plurality of comparative stations, and store the transmission angle of the optical signal at which the peak intensity is detected, in association with comparative station identification information unique to each of the plurality of comparative stations to which the optical signal is transmitted, and a measuring unit configured to determine the propagation delay time between the intermediate station and each of the plurality of comparative stations, and the propagation delay time is obtained by dividing, by 2, a round-trip propagation delay time from the time of transmission of the optical signal to the time of detection of the reflected light generated due to reflection of the optical signal on the reflection unit in each of the plurality of comparative stations. In the time comparison system, the control unit is configured to control the modulation unit to transmit the optical signal at a transmission angle according to the stored comparative station identification information, and the measuring unit is configured to determine the propagation delay time based on the round-trip propagation delay time obtained during the control.

According to this configuration, a single optical signal is dispersed in the spatial region using the optical complex amplitude modulation, and thus the single optical signal can be simultaneously transmitted to the plurality of comparative stations, which are far apart from each other. In addition, intensity scanning for the reflected light of the optical signal can be performed by transmitting the optical signal while changing the transmission angle using phase modulation, and the peak intensity can be detected to determine the directions of the plurality of comparative stations. Thus, accurate determination of direction angles of the plurality of comparative stations can be achieved. Furthermore, the optical signal can be transmitted to the plurality of comparative stations in the determined directions and the reflected light can be detected, and thus the round-trip propagation delay time between the intermediate station and each of the plurality of comparative stations can be accurately determined. Thus, based on the accurate round-trip propagation delay time, the propagation delay time between the intermediate station and each of the plurality of comparative stations can be accurately determined.

An invention according to claim 3 is the time comparison system according to claim 1 or 2, in which the reflection unit is a retroreflector configured to return an incident optical signal parallelly to the incident direction.

According to this configuration, the retroreflector can reflect the optical signal incident from the intermediate station and return the reflected light properly to the intermediate station.

An invention according to claim 4 is the time comparison system according to any one of claims 1 to 3, further including a reflector configured to reflect and transmit, to the comparative station, an optical signal transmitted from the intermediate station, when there is an obstacle blocking the optical signal, between the intermediate station and the comparative station.

According to this configuration, even if there is an obstacle that blocks the optical signal from the intermediate station, between the intermediate station and a comparative station, the reflector can reflect the optical signal to properly transmit the optical signal to the comparative station. Thus, the reflector can also reflect the reflected light generated due to reflection of the optical signal in the comparative station to properly transmit the reflected light to the intermediate station.

An invention according to claim 5 is the time comparison system according to any one of claims 1 to 3, further including a relay station configured to relay, to the comparative station, an optical signal transmitted from the intermediate station, when there is an obstacle blocking the optical signal, between the intermediate station and the comparative station.

According to this configuration, even if there is an obstacle that blocks the optical signal from the intermediate station, between the intermediate station and a comparative station, the relay station can relay the optical signal to properly transmit the optical signal to the comparative station. Thus, the relay station can also relay the reflected light generated due to reflection of the optical signal in the comparative station to properly transmit the reflected light to the intermediate station.

An invention according to claim 6 is the time comparison system according to any one of claims 4 to 6, in which the intermediate station further includes an actuator configured to horizontally and vertically rotate the optical antenna of the intermediate station.

According to this configuration, by the actuator, the optical antenna of the intermediate station can be rotated 360 degrees about the intermediate station, and thus it is possible to transmit an optical signal to a comparative station in a 360 degrees range about the intermediate station.

An invention according to claim 7 is a time comparison apparatus for determining a time difference between clocks each provided in one of a plurality of comparative function units apart from each other. The time comparison apparatus includes an intermediate function unit, the intermediate function unit including a clock and an optical antenna configured to transmit, to the plurality of comparative function units, an optical signal on which a time of the clock is superimposed and to receive reflected light of the optical signal. In the time comparison apparatus, each of the plurality of comparative function units includes an optical antenna configured to transmit and receive an optical signal, a reflection unit configured to reflect, in a direction of the intermediate function unit, an optical signal from the intermediate function unit received by the optical antenna, and a measurement unit configured to determine a time difference between a time of the clock of the comparative function unit and the time superimposed on the optical signal from the intermediate function unit, and the intermediate function unit has functions of transmitting, to the plurality of comparative function units, the optical signal on which the time associated with the intermediate function unit is superimposed, while changing a transmission angle of the optical signal, detecting a peak intensity of reflected light generated due to reflection of the transmitted optical signal on the reflection unit to determine a direction of each of the plurality of comparative function units, determining a propagation delay time between each of the plurality of comparative function units, of which the direction is determined, and the intermediate function unit, and simultaneously transmitting an optical signal to the plurality of comparative function units at the transmission angle determined for each of the plurality of comparative function units. The time comparison apparatus further includes a difference calculation unit configured to determine time information of each of the plurality of comparative function units by calculating a sum of the time difference between the time associated with the comparative function unit and the time associated with the intermediate function unit, that is determined by the measurement unit, and the propagation delay time determined by the intermediate function unit, and cancel, with the known propagation delay time, a propagation delay time included in a result of subtracting, from time information of one of the plurality of comparative function units, time information of another of the plurality of comparative function units, to determine a time difference between the plurality of comparative function units.

According to this configuration, each of the plurality of comparative function units far apart from each other, can wirelessly transmit and receive, to and from the intermediate function unit, the optical signal on which the time is superimposed, and the time difference between the plurality of comparative function units can be determined. The configuration for determining the time difference can be realized at a low cost because no optical fiber is used. Further, running costs can be reduced because no dedicated optical fiber is required. In addition, this configuration can accurately determine the time difference, because the time difference between the plurality of comparative function units can be determined by transmitting and receiving the optical signal. Thus, the time difference between clocks, for example, placed far apart from each other can be determined with high accuracy at low cost.

Effects of the Invention

According to the present disclosure, it is possible to provide a time comparison system, a time comparison apparatus, and a time comparison method for determining a time difference between clocks which, for example, are placed far apart from each other with low cost and high accuracy.

DESCRIPTION OF EMBODIMENTS

Figure 1:
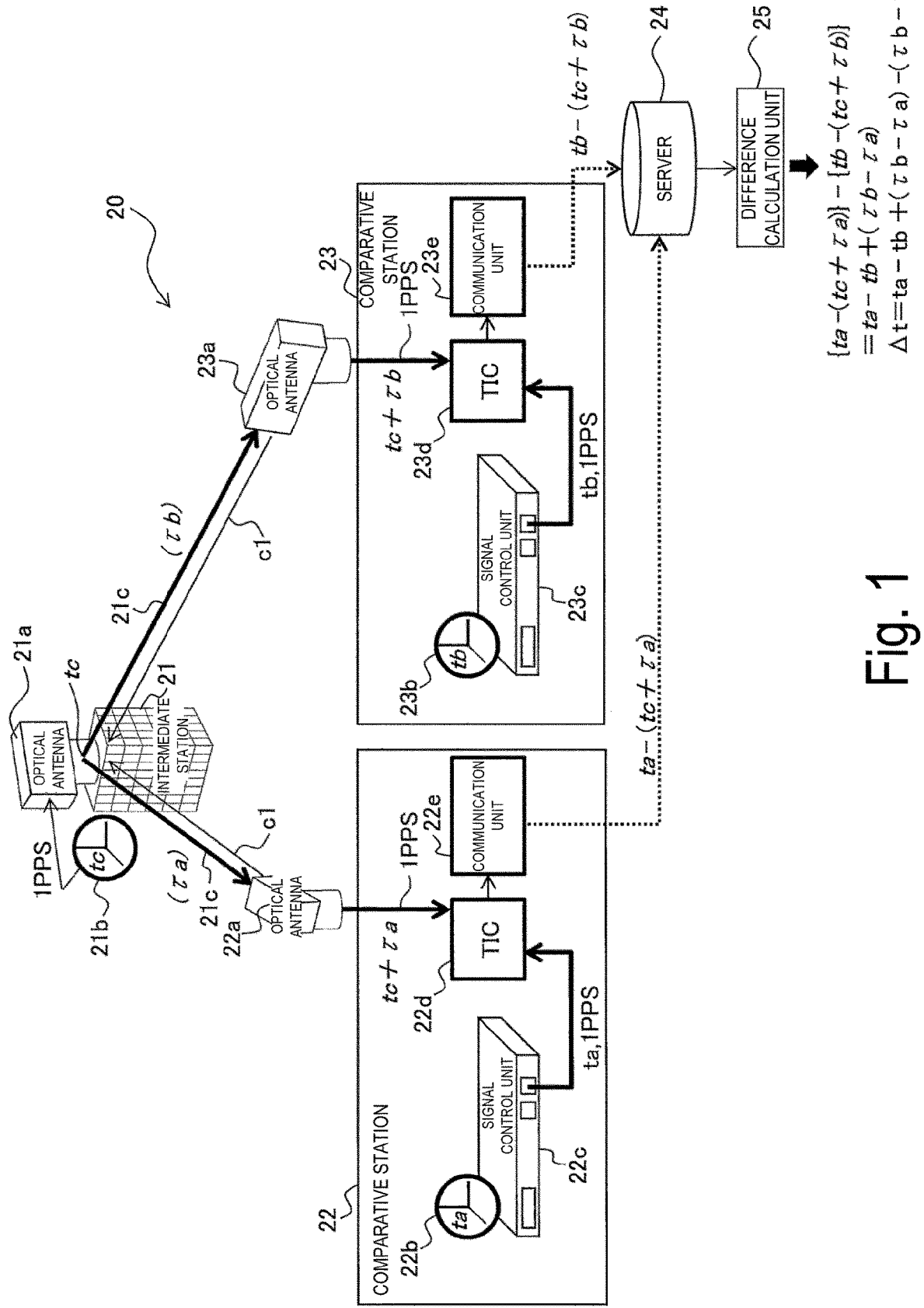
FIG. 1 is a block diagram of a configuration of a time comparison system according to an embodiment of the present disclosure.

Hereinafter, an embodiment of the present disclosure will be described with reference to the drawings.
Configuration of Embodiment
FIG. 1 is a block diagram of a configuration of a time comparison system according to an embodiment of the present disclosure.
A time comparison system (also referred to as a system) 20 illustrated in FIG. 1 includes an intermediate station 21 having an optical antenna 21a, a comparative station 22 having an optical antenna 22a, a comparative station 23 having an optical antenna 23a, a server 24, and a difference calculation unit 25. However, the server 24 and the difference calculation unit 25 may be provided in the comparative station 22 or 23. Furthermore, the difference calculation unit 25 may be internally provided in the server 24. Each of the comparative stations 22 and 23 is in a wireless or wired connection.

The intermediate station 21 and the comparative stations 22 and 23 are located in buildings or the like, which are far apart from each other. The optical antennas 22a and 23a of the comparative stations 22 and 23 and the optical antennas 21a of the intermediate station 21 are arranged such that there is no obstacle between the optical antennas 21a and each of the optical antennas 22a and 23a.

The intermediate station 21 includes a clock 21b that outputs time tc based on 1 Pulse Per Second (PPS) signal which is a pulse signal sent every second. The comparative station 22 includes a clock 22b that outputs the time to based on the 1PPS signal, and the comparative station 23 includes a clock 23b that outputs the time tb based on the 1PPS signal. Note that the clock 21b of the intermediate station 21 is preferably in synchronization with an atomic clock or a grandmaster clock, or is synchronized with a highly accurate clock placed at a remote location using OTT.

The intermediate station 21 and the comparative stations 22 and 23 transmit and receive, via optical wireless communication, optical signals such as a laser beam by the optical antennas 21a, 22a, and 23a, respectively.

The intermediate station 21 performs optical complex amplitude modulation (described below) on the laser beam, and transmits the modulated optical signal 21c, via the optical antenna 21a, to the optical antennas 22a and 23a of the plurality of comparative stations 22 and 23. During the transmission, the intermediate station 21 performs, during the optical complex amplitude modulation for the laser beam, phase modulation to transmit the optical signal 21c while changing the transmission angle (emission angle) of the optical signal 21c.

Furthermore, the intermediate station 21 determines the direction of the comparative station 22 based on the intensity (light intensity) of reflected light c1 which is the transmitted optical signal 21c that has reflected on the optical antenna 22a of the comparative stations 22 and returned to the intermediate station 21. In other words, a transmission angle (emission angle) of the optical signal 21c, at which the strongest intensity (peak intensity) of the reflected light c1 is detected, is determined as the direction of the comparative station 22. Note that the optical antenna 22a of the comparative station 22 is configured to reflect the optical signal 21c with a retroreflector 22j (FIG. 6) as described below to return the reflected light c1 to the optical antenna 21a of the intermediate station 21.

Similarly, the intermediate station 21 determines the direction of the comparative station 23 based on the intensity of reflected light c1 which is the transmitted optical signal 21c that has reflected on the optical antenna 23a of the comparative stations 23 and returned to the intermediate station 21. In other words, a transmission angle of the optical signal 21c, at which the peak intensity of the reflected light c1 is detected, is determined as the direction of the comparative station 23.

The intermediate station 21 measures a round-trip propagation delay time by transmitting the optical signal 21c in the determined direction of the comparative station 22 and detecting the reflected light c1 of the optical signal 21c, and calculates a propagation delay time (also referred to as propagation delay) τa that is half the round-trip propagation delay time. Propagation delay τa is the propagation delay time between the intermediate station 21 and the comparative station 22. The intermediate station 21 also transmits the optical signal 21c in the determined direction of the comparative station 23, and calculates propagation delay τb for the comparative station 23, based on the reflected light c1 of the optical signal 21c. The propagation delays τa and τb are associated with unique information for the comparative stations 22 and 23, respectively, and stored in a storage (not illustrated) of the server 24.

The intermediate station 21 performs optical complex amplitude modulation on the optical signal 21c and transmits the optical signal 21c from the optical antenna 21a. The optical complex amplitude modulation will now be described with reference to FIGS. 2 to 5.

Figure 2:
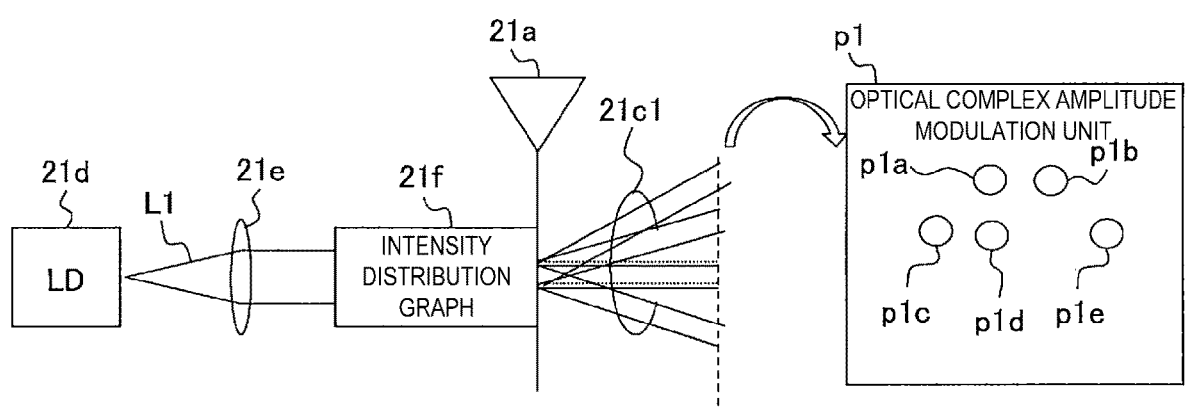
FIG. 2 is a first block diagram for explaining optical complex amplitude modulation.

As illustrated in FIG. 2, the intermediate station 21 (FIG. 1) includes a laser Diode (LD) 21d that emits a laser beam L1 to the optical antenna 21a, a lens 21e that condenses the laser beam L1, and an optical complex amplitude modulation unit (also referred to as a modulation unit) 21f. The modulation unit 21f performs processing of the optical complex amplitude modulation (also referred to as modulation) for dispersing the laser beam L1 received via the lens 21e in a spatial region, by intensity modulation, phase modulation, or the like. This modulation makes it possible to simultaneously and dispersively emit spots of laser beams to different locations, as represented by reference signs p1a, p1b, p1c, p1d, and p1e in an intensity distribution graph p1.

In other words, by transmitting the laser beam by the optical complex amplitude modulation unit 21f, as an optical signal 21c1 from the optical antenna 21a, it is possible to simultaneously and dispersively emit spots of laser beams p1a to p1e to different locations. The LD 21d corresponds to a laser unit in the claims.

In this modulation, the modulation unit 21f can perform phase modulation on the laser beam to transmit the optical signal 21c while changing the transmission angle (emission angle) of the optical signal 21c.

Figure 3:
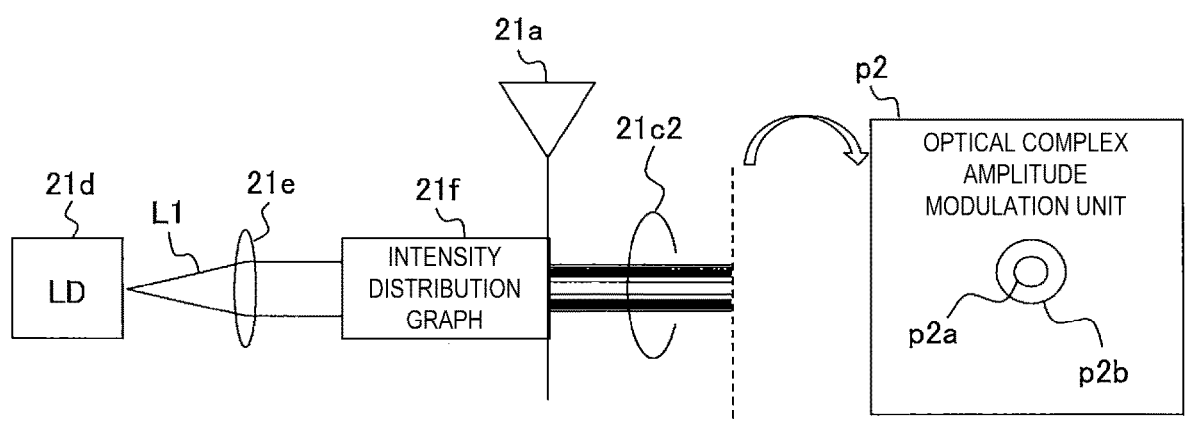
FIG. 3 is a second block diagram for explaining optical complex amplitude modulation.

Further, as illustrated in FIG. 3, the modulation unit 21f can perform optical complex amplitude modulation on the laser beam L1 to set the spot diameter of an optical signal 21c2 to be transmitted, to a reduced spot p2a or enlarged spot p2b, as illustrated in intensity distribution graph p2.

Figure 4:
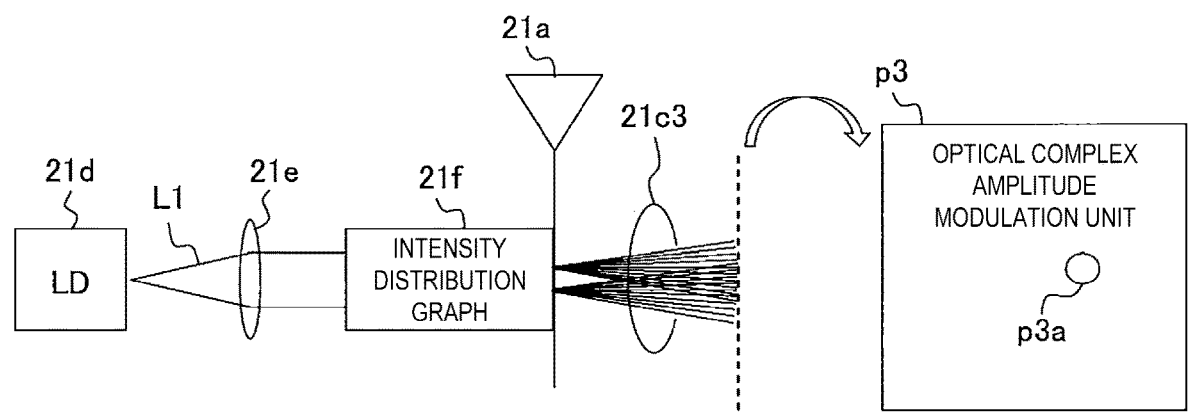
FIG. 4 is a third block diagram for explaining optical complex amplitude modulation.

As illustrated in FIG. 4, the intermediate station 21 performs scanning for reflected light of the optical signal 21c by transmitting, via the optical antenna 21a, an optical signal 21c3 generated by subjecting the laser beam L1 to the optical complex amplitude modulation, while changing the transmission angle by phase modulation. As a result of the scanning, as illustrated in an intensity distribution graph p3, the intermediate station 21 detects the direction of a spot p3a at which the intensity of the reflected light of the optical signal 21c3 is the strongest (peak intensity). Based on this detection, the optical signal 21c3 is transmitted in the reflection intensity direction of the peak intensity. Thus, the intermediate station 21 can properly transmit the optical signal 21c3 to the comparative stations 22 and 23.

Figure 5:
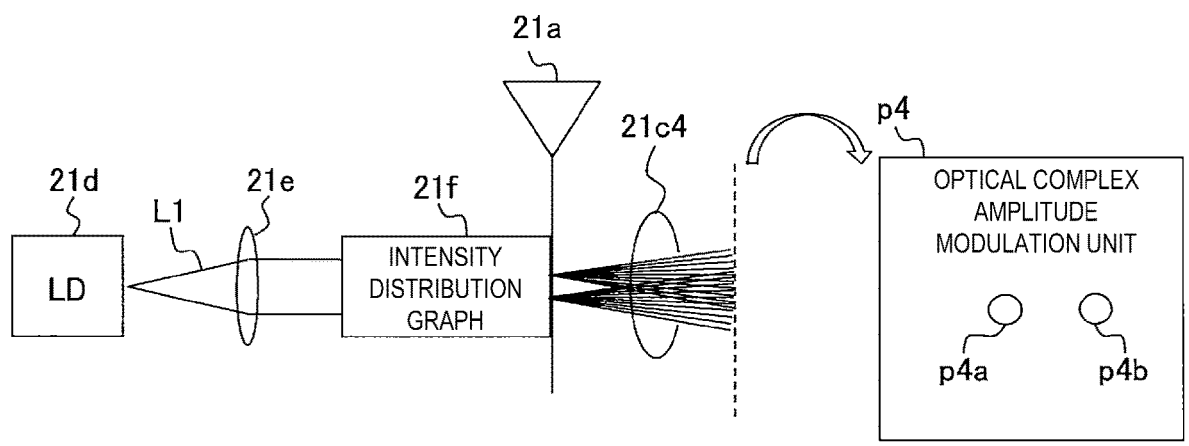
FIG. 5 is a fourth block diagram for explaining optical complex amplitude modulation.

As described above, the intermediate station 21 performs, at the modulation unit 21f, optical complex amplitude modulation on the laser beam L1 to dispersively emit a plurality of the spot diameters of laser beams, and during the optical complex amplitude modulation, the spot diameter is adjusted to a diameter optimized for detecting the comparative station 22 or 23. Furthermore, as illustrated in FIG. 5, the intermediate station 21 performs scanning, while transmitting an optical signal 21c4, which is based on the emitted laser beam, at varying transmission angles. By emitting the optical signal 21c4 to spot positions p4a and p4b, where the peak intensity of the reflected light of the optical signal 21c4 is detected during the scanning, the optical signal 21c4 can be properly emitted to the comparative stations 22 and 23.

Such operation makes it possible to simultaneously transmit the optical signal 21c based on the time tc, from the single optical antenna 21a of the intermediate station 21 illustrated in FIG. 1, to the optical antennas 22a and 23a of the plurality of comparative stations 22 and 23.

Returning to FIG. 1, in addition to the optical antenna 22a and the clock 22b, the comparative station 22 includes a signal control unit 22c, a TIC 22d, and a communication unit 22e.

Similarly, in addition to the optical antenna 23a and the clock 23b, the comparative station 23 includes a signal control unit 23c, a TIC 23d, and a communication unit 23e.

The optical antenna 22a of the comparative station 22 receives the optical signal 21c transmitted from the intermediate station 21. The time tc based on the 1PSS signal superimposed on the received optical signal 21c is input to the TIC 22d. The input time tc is delayed by the propagation delay time τa between the intermediate station 21 and the comparative station 22, which is represented as tc+τa in FIG. 1.

The signal control unit 22c inputs, to the TIC 22d, the time ta of the clock 22b based on the 1PSS signal. The TIC 22d subtracts the time tc of the intermediate station 21 from the time ta of the clock 22b to calculate the time difference ta–tc therebetween. The time difference ta–tc is transmitted from the communication unit 22e to the server 24. In FIG. 1, the time difference ta–tc is represented as ta–(tc+τa) in consideration of the propagation delay τa for the time tc.

In the comparative station 23, similarly to the comparative station 22 described above, time difference tb–tc (represented as tb–(tc+τb) in FIG. 1) between the time tc of the intermediate station 21 and the time tb of the comparative station 23 is calculated and transmitted via the communication unit 23e to the server 24.

The server 24 inputs, to the difference calculation unit 25, the information of the time difference ta–tc and the time difference tb–tc received from the comparative stations 22 and 23, respectively, and the corresponding propagation delays τa and τb between the intermediate station 21 and each of the comparative stations 22 and 23.

The difference calculation unit 25 subtracts, from the time information ta–(tc+τa), which is the sum of the propagation delay τa and the time difference related to the comparative station 22, the time information tb–(tc+τb), which is the sum of the propagation delay τb and the time difference related to the comparative station 23. In other words, the difference calculation unit 25 calculates {ta–(tc+τa)}–{tb–(tc+τb)} to determine ta–tb+(τb–τa). (τb–τa) is a known value, and thus the difference calculation unit 25 cancel (τb–τa) with the same (τb–τa) to determine a time difference Δt=ta–tb between the comparative station 22 and the comparative station 23.

The time tb of the clock 23b of the comparative station 23 can be shifted by the time difference Δt to be synchronized with the time ta of the clock 22a of the comparative station 22. Alternatively, the time ta of the clock 22b of the comparative station 22 can be shifted to be synchronized with the time tb of the clock 23a of the comparative station 23.

In the above description, it is assumed that the clocks 21b, 22b, and 23b output the time tc, ta, and tb based on the 1PPS signal, respectively. However, the clocks 21b, 22b, and 23b may output the time tc, ta, and tb based on a PPS signal having successive 1PPS.

Detailed Configuration of Time Comparison System

Figure 6:
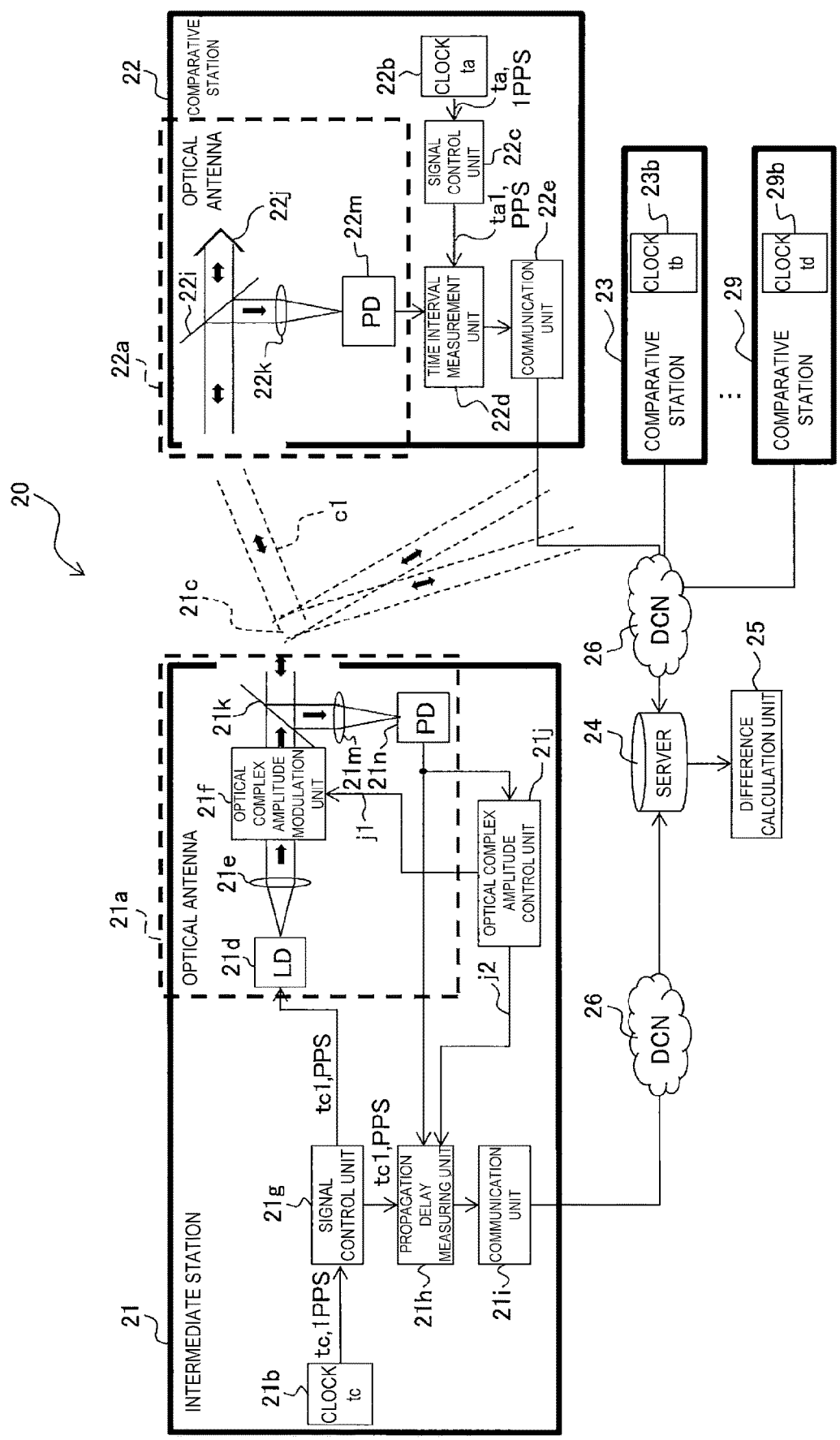
FIG. 6 is a block diagram of a detailed configuration of an intermediate station and a comparative station in the time comparison system according to the present embodiment.

Next, detailed configurations of the intermediate station 21 and the comparative station 22 of the time comparison system 20 illustrated in FIG. 6 is described. Note that, in the system 20, the intermediate station 21 and a plurality of comparative stations 22, 23 to 29 are connected to the server 24 via a Data Communication Network (DCN) 26 that performs configuration, disconnection, switching, and the like of optical paths. The comparative stations 22, 23 to 29 are located in buildings or the like (not illustrated) apart from each other. The comparative stations 22, 23 to 29 have the same configuration, and thus explanation is described using the comparative station 22 as a representative of the comparative stations.

In addition to the above-described optical antenna 21a and the clock 21b, the intermediate station 21 includes a signal control unit 21g, a propagation delay measuring unit 21h, a communication unit 21i, and an optical complex amplitude control unit 21j. In addition to the LD 21d, the lens 21e, and the optical complex amplitude modulation unit 21f described above, the optical antenna 21a includes a beam splitter 21k, a lens 21m, and a photodiode (PD) 21n. The intermediate station 21 including these components 21a, 21b, 21g, 21h, 21i, and 21j corresponds to the intermediate function unit in the claims.

The comparative station 22 includes the optical antenna 22a, the clock 22b, the signal control unit 22c, a time interval measurement unit 22d as the TIC 22d (FIG. 1), and the communication unit 22e. The optical antenna 22a includes a beam splitter 22i, the retroreflector 22j, a lens 22k, and PD 22m. The retroreflector 22j returns incident optical signal parallel to the incident direction. Note that the retroreflector 22j corresponds to a reflection unit described in the claims. Furthermore, the comparative station 22 corresponds to a comparative function unit described in the claims.

Note that the components 21a, 21b, 21g, 21h, 21i, 21j, 21d, 21e, 21f, 21k, 21m, and 21n of the intermediate station 21 and the components 22a, 22b, 22c, 22d, and 22e of the comparative station 22 collectively correspond to the time comparison apparatus described in the claims.

In the intermediate station 21, the signal control unit 21g outputs, to LD 21d, a Continuous Wave (CW) drive signal tc1 that is a PPS continuous oscillation signal, based on the 1PPS signal based on the time tc of the clock 21b. The LD 21d emits, according to the CW drive signal tc1, a laser beam generated by modulating a continuous PPS signal, such as 10 PPS or 100 PPS. The emitted laser beam is input to the optical complex amplitude modulation unit 21f via the lens 21e. Note that, instead of the PPS signal, the 1PPS signal based on the time tc may be modulated for the laser beam.

The modulation unit 21f performs the optical complex amplitude modulation process on the input laser beam. The modulated laser beam is simultaneously transmitted, as an optical signal 21c, to each of the comparative stations 22, 23, and 29 via the beam splitter 21k. The modulation unit 21f is configured to perform phase modulation on the optical signal 21c during the optical complex amplitude modulation to transmit the optical signal 21c while changing the transmission angle.

The optical signal 21c transmitted from the optical antenna 21a is reflected on the retroreflector 22j of the comparative station 22, and returns to the intermediate station 21 as reflected light c1. This reflected light c1 is reflected at 90 degrees on the beam splitter 21k of the intermediate station 21 and is input to PD 21n via the lens 21m.

The PD 21n converts the input reflected light c1 into an electrical signal, and inputs the electrical signal into the propagation delay measuring unit (also referred to as a measuring unit) 21h and the optical complex amplitude control unit (also referred to as a control unit) 21j.

The control unit 21j performs intensity scanning for the reflected light c1, while the optical signal 21c is transmitted at varying angles, as described above. The control unit 21j detects the peak intensity based on the intensity of the reflected light c1 that varies during the scanning, and stores information of the transmission angle of the optical signal 21c, at which the peak intensity is detected, in a built-in storage (not illustrated).

Furthermore, the control unit 21j outputs a control signal j1 according to the stored transmission angle information, to the modulation unit 21f. The control signal j1 is a control signal for transmitting (emitting), at an angle indicated by the stored transmission angle information, the optical signal 21c subjected to the optical complex amplitude modulation.

The modulation unit 21f emits the laser beam (i.e., transmits the optical signal 21c) at the angle indicated by the control signal j1. As a result of this transmission, the optical signal 21c has been transmitted to the comparative station 22.

Furthermore, when storing the transmission angle information, the control unit 21j stores the transmission angle information in association with comparative station identification information j2 unique to the comparative station 22.

The electrical signal of the reflected light c1 of the optical signal 21c transmitted from the optical antenna 21a to the comparative station 22 is input into the measuring unit 21h, and the comparative station identification information j2 associated with the transmission angle information held in the control unit 21j related to the reflected light c1 is also input into the measuring unit 21h.

With these inputs, the measuring unit 21h determines the propagation delay time (propagation delay) τa by dividing, by two, the round-trip propagation delay time between the time of transmission of the optical signal 21c from the optical antenna 21a to the comparative station 22, and the time of detection of the reflected light c1 of the optical signal 21c.

Furthermore, the measuring unit 21h outputs, to the communication unit 21i, the input comparative station identification information j2 of the comparative station 22, in association with the propagation delay τa of the comparative station 22+the time tc of the clock 21b. The communication unit 21i transmits the information of τa+tc associated with the comparative station identification information j2 of the comparative station 22, to the server 24 via DCN26. Similarly, the information of the other comparative stations 23 and 29 is transmitted to the server 24. The server 24 stores the information in the storage (not illustrated).

The retroreflector 22j of the comparative station 22 reflects the optical signal 21c from the intermediate station 21 that has entered via the beam splitter 22i such that the reflected light returns to the intermediate station 21 via the beam splitter 22i. In addition, the optical signal 21c from the intermediate station 21 is reflected on the beam splitter 21i at 90 degrees and is input to PD 22m. The PD 22m converts the input optical signal 21c into an electrical signal and inputs the electrical signal to the time interval measurement unit 22d.

Based on the 1PPS signal based on the time ta from the clock 22b, the signal control unit 22c inputs PPS time signal ta1 to the time interval measurement unit (also referred to as the measurement unit) 22d.

The measurement unit 22d outputs, to the communication unit 22e, the information of the time difference ta–tc between the time tc of the intermediate station 21 and the time ta based on the time signal ta1 of the comparative station 22. The communication unit 22e transmits the information of the time difference ta–tc to the server 24 via the DCN26. Similarly, information on the time difference of the other comparative stations 23 and 29 is transmitted to the server 24 as well. The server 24 stores the information in the storage.

The difference calculation unit 25 determines the time difference between the comparative stations (for example, the comparative stations 22 and 23) to compare. At this time, the difference calculation unit 25 retrieves the information of the time difference ta–tc between the comparative station 22 and the intermediate station 21 stored in the server 24, and the information of the propagation delay τa associated with the comparative station identification information j2 of the comparative station 22. Furthermore, the difference calculation unit 25 calculates ta–(tc+τa) (see FIG. 1), that is a result of subtracting, from the retrieved time ta of the comparative station 22, the time tc of the intermediate station 21, and taking the propagation delay τa into account.

Similarly, the difference calculation unit 25 retrieves the information of the time difference tb–tc between the comparative station 23 and the intermediate station 21 stored in the server 24, and the information of the propagation delay τb associated with the comparative station identification information j2 of the comparative station 23. Furthermore, the difference calculation unit 25 calculates tb–(tc+τb) (see FIG. 1), that is a result of subtracting, from the time tb of the clock 23b of the comparative station 23, the time tc of the intermediate station 21, and taking the propagation delay τb into account.

Next, the difference calculation unit 25 subtracts, from ta–(tc+τa) relating to the comparative station 22, tb–(tc+τb) relating to the comparative station 23 to determine ta–tb+ (τb–τa). Then, the difference calculation unit 25 cancels the known (τb–τa) with the same (τb–τa) to determine the time difference Δt=ta–tb between the comparative station 22 and the comparative station 23.

Operation of Embodiment

Figure 7:
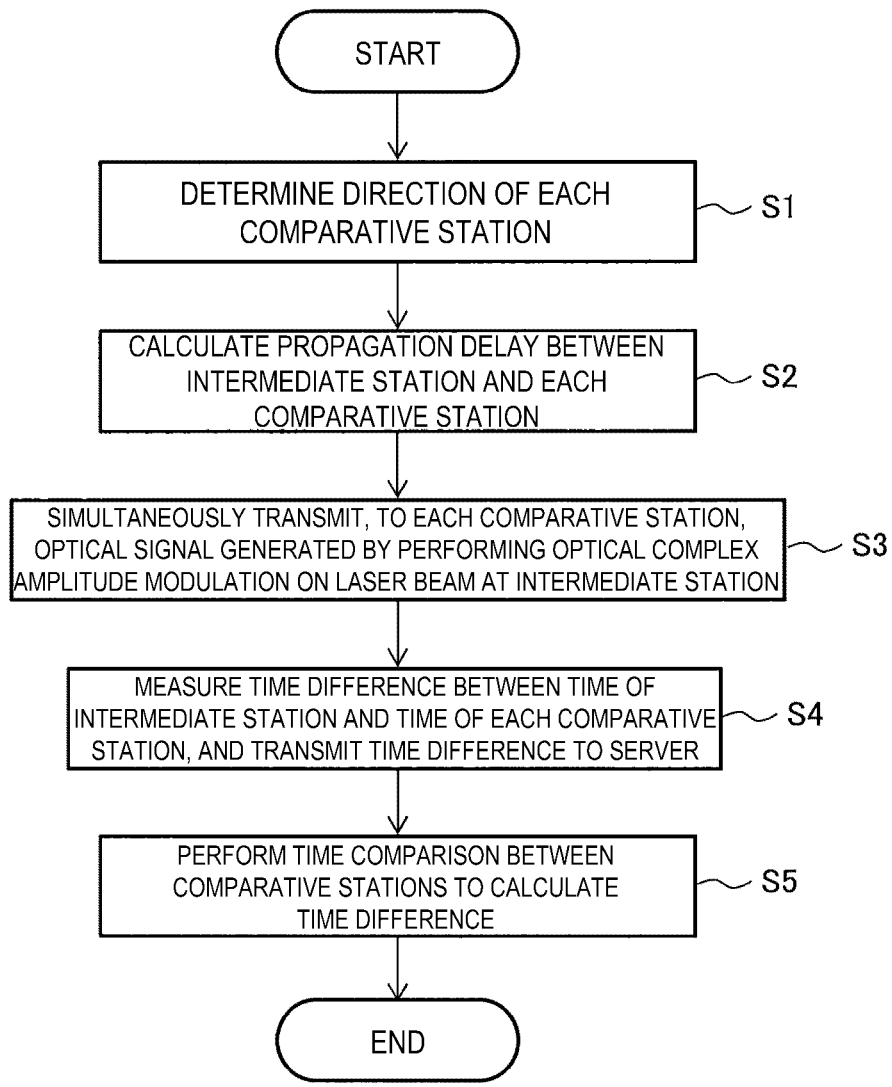
FIG. 7 is a flowchart for explaining an operation of a time comparison process in the time comparison system according to the present embodiment.

Next, an operation in the time comparison processing in the time comparison system 20 according to the present embodiment will be described with reference to a flowchart of FIG. 7 and a block diagram of FIG. 6.

In step S1 illustrated in FIG. 7, the intermediate station 21 determines the direction of each of the comparative stations 22, 23, and 29 in the following manner. The intermediate station 21 simultaneously transmits the optical signal 21c obtained by performing, by the modulation unit 21f, the optical complex amplitude modulation on the laser beam from LD 21d on which the time tc is superimposed, to each of the comparative stations 22, 23, and 29 via the beam splitter 21k.

During this transmission, the intermediate station 21 performs scanning for the reflected light c1 generated due to reflection of the optical signal 21c in each of the comparative stations 22, 23, and 29, while transmitting the optical signal 21c at varying transmission angles. The scanned reflected light c1 is converted to an electrical signal at PD 21n, and is input to the measuring unit 21h and the control unit 21j.

The control unit 21j detects the peak intensity based on the intensity of the reflected light c1 converted into an electrical signal, and determines the direction (direction angle) of each of the comparative stations 22, 23, and 29. At this time, the control unit 21j stores information of the transmission angle of the optical signal 21c at which the peak intensity is detected, in association with the comparative station identification information j2 of each of the comparative stations 22, 23, and 29 to which the optical signal 21c has been transmitted.

Next, at step S2, the intermediate station 21 determines the propagation delays τa, τb, and τc for the comparative stations 22, 23, and 29 with respect to the intermediate station 21 in the following manner. Note that, τa is the propagation delay between the intermediate station 21 and the comparative station 22, τb is the propagation delay between the intermediate station 21 and the comparative station 23, and τc is the propagation delay between the intermediate station 21 and the comparative station 29.

First, the control unit 21j outputs the control signal j1 according to the stored transmission angle information, to the modulation unit 21f. This process is performed for each piece of the transmission angle information of the comparative stations 22, 23, and 29. The modulation unit 21f transmits the laser beam optical signal 21c to each of the comparative stations 22, 23, and 29 at an angle indicated by the control signal j1 for each of the comparative stations 22, 23, and 29.

The transmitted optical signal 21c is reflected in each of the comparative stations 22, 23, and 29, and the reflected light c1 enters the intermediate station 21. The reflected light c1 entering the intermediate station 21 is converted to an electrical signal at PD 21$n$, input to the measuring unit 21$h$, and input to the control unit 21$j$. The control unit 21$j$ inputs, to the measuring unit 21$h$, the comparative station identification information j2 of each of the comparative stations 22, 23, and 29 relating to the reflected light c1 corresponding to the electrical signal.

In response to these inputs, the measuring unit 21$h$ determines the propagation delay (propagation delay time) τa by dividing, by two, the round-trip propagation delay time between the time of transmission of the optical signal 21$c$ from the optical antenna 21$a$ to the comparative station 22, and the time of detection of the reflected light c1 of the optical signal 21$c$.

The measuring unit 21$h$ outputs, to the communication unit 21$i$, the input comparative station identification information j2 of the comparative station 22, in association with the propagation delay τa of the corresponding comparative station 22+the time tc of the intermediate station 21. Similarly, for the comparative station 23, the comparative station identification information j2 of the comparative station 23 is associated with the propagation delay τb of the comparative station 23+time tc and output to the communication unit 21$i$, and for the comparative station 29, the comparative station identification information j2 of the comparative station 29 is associated with the propagation delay τc of the comparative station 29+time tc and output to the communication unit 21$i$.

The communication unit 21$i$ transmits the information of τa+tc, τb+tc, and τc+tc associated with the comparative station identification information j2 of the comparative stations 22, 23, and 29, respectively, to the server 24 via DCN26. The server 24 stores these pieces of information.

Next, in step S3, the intermediate station 21 performs, by the modulation unit 21$f$, the optical complex amplitude modulation on the laser beam from LD 21$d$ on which the time tc is superimposed, and transmits the modulated optical signal 21$c$ to each of the comparative stations 22, 23, and 29 simultaneously.

Next, in step S4, each of the comparative stations 22, 23, and 29 receives the optical signal 21$c$ from the intermediate station 21, measures the time difference between the time tc of the intermediate station 21 superimposed on the received optical signal 21$c$ and a corresponding one of the times ta, tb, and td of the comparative stations 22, 23, and 29 in the following manner, and transmits the measured time difference to the server 24.

That is, the comparative station 22 converts, by the PD 22$m$, the optical signal 21$c$ received from the intermediate station 21, into an electrical signal, and inputs the electrical signal to the time interval measurement unit 22$d$. In addition, based on the 1PPS signal based on the time ta from the clock 22$b$ of the comparative station 22, the signal control unit 22$c$ inputs the PPS time signal ta1 to the time interval measurement unit 22$d$.

The time interval measurement unit 22$d$ outputs, to the communication unit 22$e$, the information of the time difference ta−tc between the time tc of the intermediate station 21 and the time ta based on the time signal ta1 of the comparative station 22. The communication unit 22$e$ transmits the information of the time difference ta−tc to the server 24 via the DCN26. As with this process, information on the time difference of the other comparative stations 23 and 29 is also transmitted to the server 24. The server 24 stores the information.

Next, in step S5, the difference calculation unit 25 performs comparison between the times ta, tb, and td of the comparative stations 22, 23, and 29, and determines the time difference in the following manner. The difference calculation unit 25 first determines comparative stations to be subjected to time comparison. For example, the comparative stations 22 and 23 are determined to be subjected to time comparison.

After this determination, the difference calculation unit 25 retrieves the information of the time difference ta−tc between the comparative station 22 and the intermediate station 21 stored in the server 24, and the information of the propagation delay τa associated with the comparative station identification information j2 of the comparative station 22. Next, the difference calculation unit 25 calculates ta−(tc+τa) (see FIG. 1), that is a result of subtracting, from the retrieved time ta of the comparative station 22, the time tc of the intermediate station 21, and taking the propagation delay τa into account.

Similarly, the difference calculation unit 25 retrieves the information of the time difference tb−tc between the comparative station 23 and the intermediate station 21 stored in the server 24, and the information of the propagation delay τb associated with the comparative station identification information j2 of the comparative station 23. Next, the difference calculation unit 25 calculates tb−(tc+τb) (see FIG. 1), that is a result of subtracting, from the retrieved time tb of the clock 23$b$ of the comparative station 23, the time tc of the intermediate station 21, and taking the propagation delay τb into account.

Next, the difference calculation unit 25 subtracts, from ta−(tc+τa) relating to the comparative station 22, tb−(tc+τb) relating to the comparative station 23 to determine ta−tb+(τb−τa). Then, the difference calculation unit 25 cancels the known (τb−τa) with the same (τb−τa) to determine the time difference Δt=ta−tb between the comparative station 22 and the comparative station 23.

Effects of Embodiment

Effects of the time comparison apparatus used in the time comparison system 20 according to the present embodiment will be described. The time comparison system 20 is for determining a time difference between clocks each provided in one of a plurality of comparative stations 22, 23, and 29 that are far apart from each other. The time comparison system 20 is characterized as follows.

(1) The time comparison system 20 includes the intermediate station 21, the comparative stations 22, 23, and 29, and the difference calculation unit 25. The intermediate station 21 includes the clock 21$b$ and the optical antenna 21$a$ that transmits, to the comparative stations 22, 23, and 29, the optical signal 21$c$ on which the time tc of the clock 21$b$ is superimposed, and receives the reflected light c1 of the optical signal 21$c$.

Each of the comparative stations 22, 23, and 29 includes the optical antenna 22$a$ that transmits and receives the optical signal 21$c$, the retroreflector 22$j$ that reflects, in the direction of the intermediate station 21, the optical signal 21$c$ from the intermediate station 21 received by the optical antenna 22$a$, and the measurement unit 22$d$ that determines the time difference between the time of the clock of the comparative station (the comparative station 22, 23, or 29) and the time superimposed on the optical signal 21$c$ from the intermediate station 21.

The intermediate station 21 further includes the intermediate function unit characterized as follows. The intermediate function unit transmits, to the comparative stations 22, 23, and 29, the optical signal 21$c$ on which the time associated with the intermediate station 21 is superimposed, while changing the transmission angle. Furthermore, the intermediate function unit detects the peak intensity of the reflected light c1 generated due to reflection of the transmitted optical signal 21c on the retroreflector 22j to determine the direction (direction angle) of the comparative stations 22, 23, and 29. Furthermore, the intermediate function unit determines the propagation delay time between the intermediate station 21 and each of the comparative stations 22, 23, and 29 of which the direction has been determined, and simultaneously transmits the optical signal 21c to each of the plurality of comparative stations 22, 23, and 29 at the transmission angle determined for each of the comparative stations 22, 23, and 29.

The difference calculation unit 25 calculates the sum of the time difference between the time associated with each of the comparative stations 22, 23, and 29 and the time associated with the intermediate station 21, which is determined by the measurement unit 22d, and the propagation delay time determined by the intermediate function unit, to determine the time information for each of the comparative stations 22, 23, and 29. Furthermore, the difference calculation unit 25 is configured to cancel, with the known propagation delay time (τb−τa), the propagation delay time {(τb−τa) in FIG. 1} included in the result of subtracting, from the time information of one of the comparative stations 22, 23, and 29, the time information of another of the comparative stations 22, 23, and 29, to determine the time difference between the comparative stations 22, 23, and 29.

According to this configuration, each of the comparative stations 22, 23, and 29 apart from each other, wirelessly transmits and receives, to and from the intermediate station 21, the optical signal 21c on which the time is superimposed, for determining the time difference between the comparative stations 22, 23, and 29. The configuration for determining the time difference can be realized at a low cost because no optical fiber is used. Further, running costs can be reduced because no dedicated optical fiber is required. In addition, this configuration can accurately determine the time difference, because the time difference between the comparative stations 22, 23, and 29 can be determined by transmitting and receiving the optical signal 21c.

This configuration characterized by the use of optical and radio signals can be used in environments where electromagnetic waves (interference waves and disturbance waves) which may generate noise in GPS signals are present, and can be operated at low cost because there is no need for dark fibers or cost of occupying channels.

Thus, the time difference between clocks, for example, placed far apart from each other can be determined with high accuracy at low cost.

(2) The intermediate function unit includes the LD 21d that emits a laser beam on which the time of the clock of the intermediate station 21 is superimposed, the modulation unit 21f, the control unit 21j, and the measuring unit 21h.

The modulation unit 21f performs optical complex amplitude modulation on a laser beam to disperse spots of the laser beam in a spatial region. Furthermore, the modulation unit 21f transmits, to the comparative stations 22, 23, and 29, the optical signal 21c that has been subjected to the optical complex amplitude modulation, and changes the transmission angle of the optical signal 21c by performing, during the optical complex amplitude modulation, phase modulation on the laser beam.

The control unit 21j performs intensity scanning for the reflected light c1 that has generated due to reflection of the optical signal 21c transmitted at varying angles on the retroreflector 22j, and detects the peak intensity to determine the direction of the comparative stations 22, 23, and 29. Furthermore, the control unit 21j stores the transmission angle of the optical signal 21c at which the peak intensity is detected, in association with the comparative station identification information j2 unique to each of the comparative stations 22, 23, and 29 to which the optical signal 21c has been transmitted.

Then, the control unit 21j controls the modulation unit 21f to transmit the optical signal 21c at a transmission angle according to the stored comparative station identification information j2.

The measuring unit 21h is configured to determine the propagation delay time between the intermediate station 21 and each of the comparative stations 22, 23, and 29, by dividing, by 2, the round-trip propagation delay time from the time of transmission of the optical signal 21c to the time of detection of the reflected light c1 generated due to reflection of the optical signal 21c on the retroreflector 22j in each of the comparative stations 22, 23, and 29.

According to this configuration, the single optical signal 21c is dispersed in the spatial region using the optical complex amplitude modulation, and thus the single optical signal 21c can be simultaneously transmitted to the plurality of comparative stations 22, 23, and 29, which are far apart from each other. In addition, intensity scanning for the reflected light c1 of the optical signal 21c can be performed by transmitting the optical signal 21c while changing the transmission angle using phase modulation, and the peak intensity can be detected to determine the directions of the comparative stations 22, 23, and 29. Thus, accurate determination of direction angles of the comparative stations 22, 23, and 29 can be achieved. Furthermore, the optical signal 21c can be transmitted to the comparative stations 22, 23, and 29 in the determined directions and the reflected light c1 can be detected, and thus the round-trip propagation delay time between the intermediate station 21 and each of the comparative stations 22, 23, and 29 can be accurately determined. Thus, based on the accurate round-trip propagation delay time, the propagation delay time between the intermediate station 21 and each of the comparative stations 22, 23, and 29 can be accurately determined.

(3) Each of the comparative stations 22, 23, and 29 includes the retroreflector 22j that returns the incident optical signal 21c parallelly to the incident direction.

According to this configuration, the retroreflector 22j can reflect the optical signal 21c incident from the intermediate station 21 and return the reflected light properly to the intermediate station 21.

In addition, an actuator may be provided that can horizontally and vertically rotate the optical antenna 21a of the intermediate station 21. According to this configuration, by the actuator, the optical antenna 21a of the intermediate station 21 can be rotated 360 degrees about the intermediate station 21, and thus it is possible to transmit an optical signal to a comparative station in a 360 degrees range about the intermediate station 21.

Application Example of Embodiment

Figure 8:
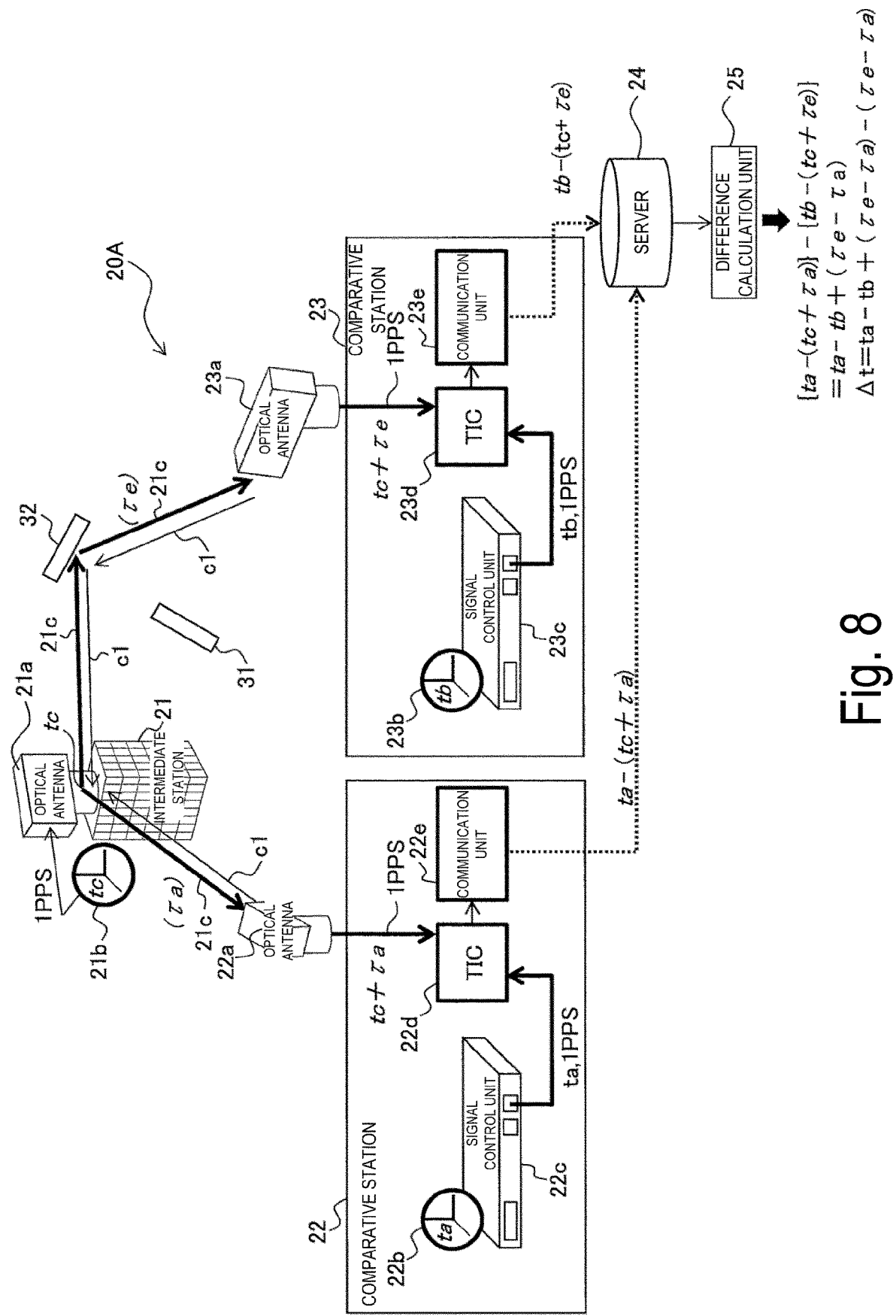
FIG. 8 is a block diagram of a configuration of a time comparison system according to an application example of the present embodiment.
Figure 9:
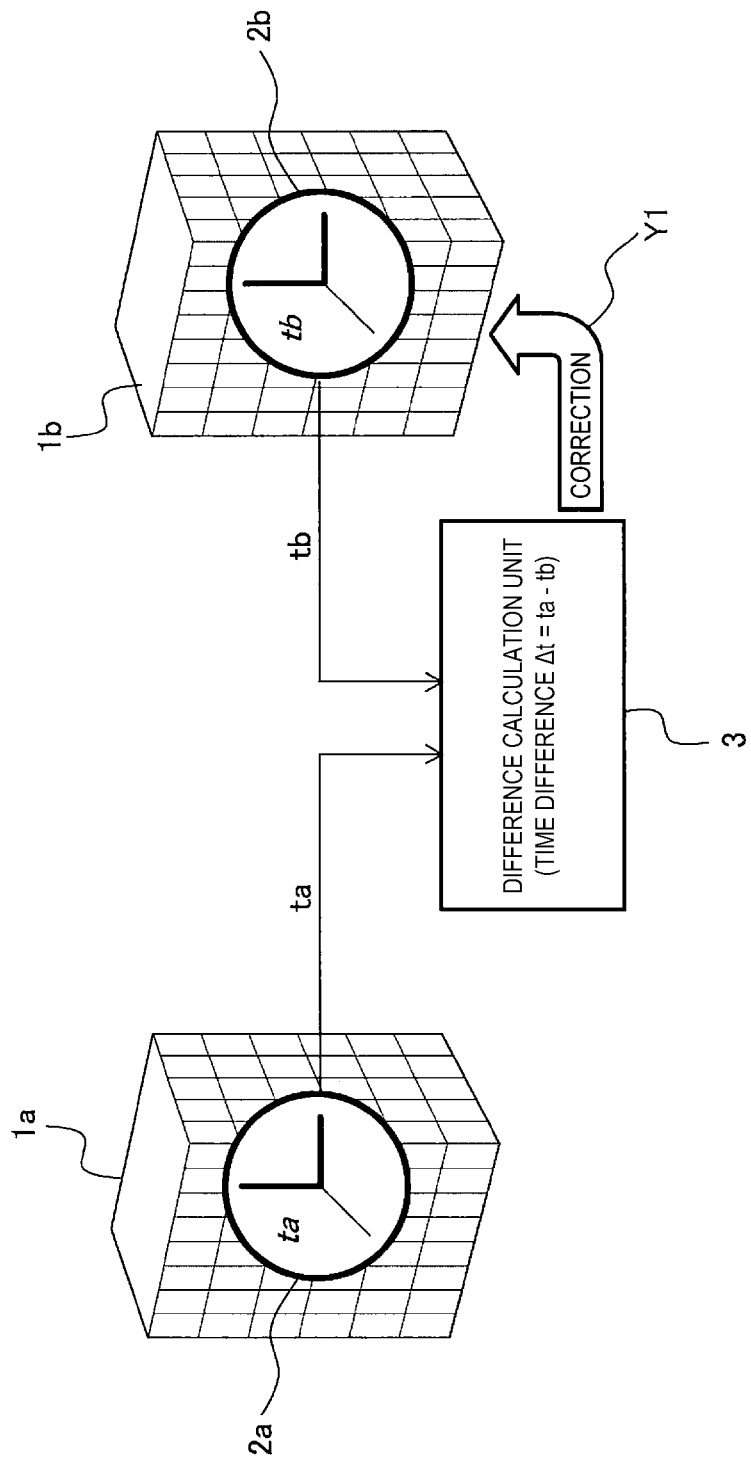
FIG. 9 is a block diagram of a conventional configuration for synchronizing time based on time difference between clocks in buildings far apart from each other.
Figure 10:
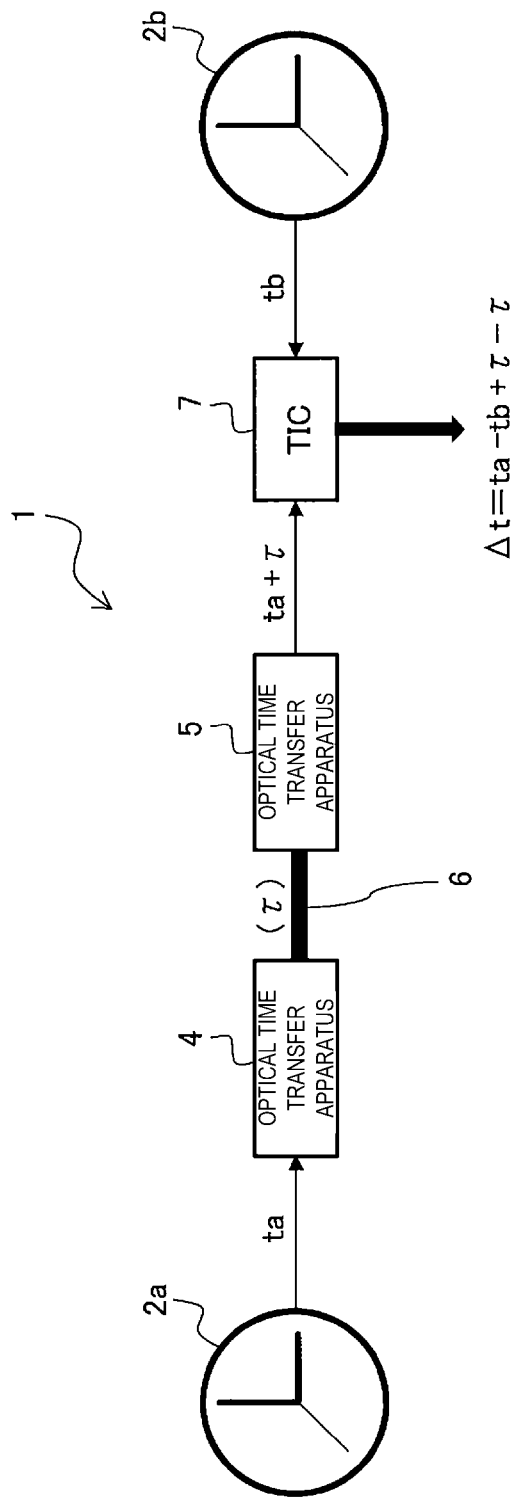
FIG. 10 is a block diagram of a conventional configuration for determining a time difference between clocks far apart from each other.
Figure 11:
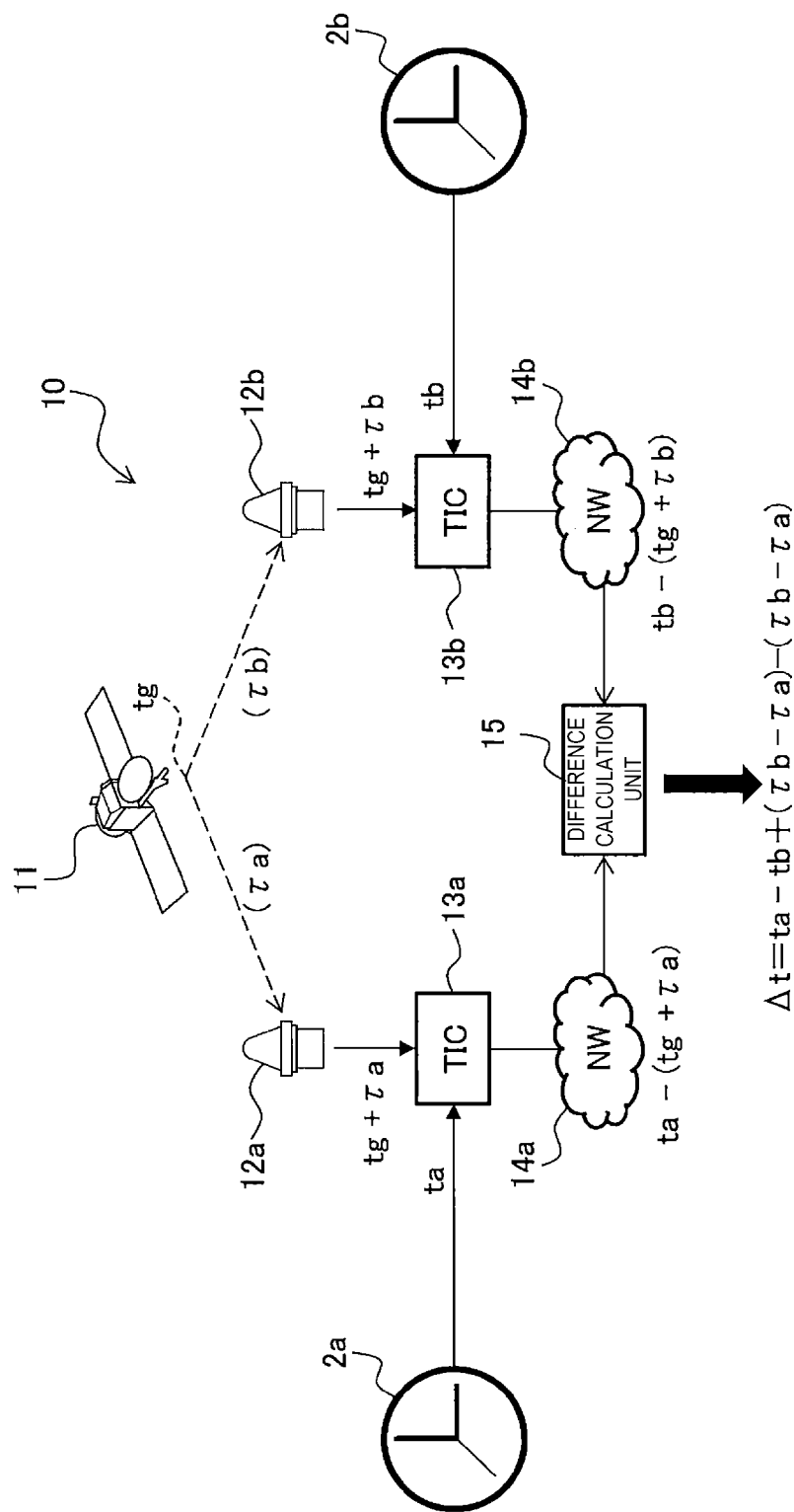
FIG. 11 is a block diagram of a configuration of a GPS-CV system 10.

FIG. 8 is a block diagram of a configuration of a time comparison system according to an application example of the embodiment of the present disclosure.

The difference between a time comparison system 20A illustrated in FIG. 8 and the system 20 (FIG. 1) according to the above-described embodiment is that when an obstacle 31, for example, a building, is interposed on a straight line connecting the optical antenna 21a of the intermediate station 21 and the optical antenna 23a of the comparative station 23, a reflector 32, for example, a mirror, that reflects light is placed apart from the obstacle 31, and communication between the optical antennas 21a and 23a can be achieved by using the reflected light c1 to reflect the optical signal 21c.

As a specific example, assume that a building 31, that is the obstacle 31, is constructed on a straight line connecting the optical antenna 21a of the intermediate station 21 and the optical antenna 23a of the comparative station 23. In this case, the optical signal 21c transmitted from the optical antenna 21a of the intermediate station 21 is blocked by the building 31, and the optical signal 21c cannot be received by the optical antenna 23a of the comparative station 23. Thus, the reflector 32 is provided at a location allowing the optical signal 21c, that has been transmitted from the optical antenna 21a of the intermediate station 21, to be reflected and transmitted to the optical antenna 23a of the comparative station 23. Such location is, for example, a location of a wall or rooftop of a building, a steel tower, or the like that is apart from the obstacle 31 in a horizontal direction intersecting the straight line.

In this configuration, the optical signal 21c transmitted from the optical antenna 21a of the intermediate station 21 is reflected by the reflector 32 and transmitted to the optical antenna 23a of the comparative station 23. The transmitted optical signal 21c is reflected by the retroreflector 22j (FIG. 6) of the optical antenna 21a, and the reflected light c1 is reflected by the reflector 32 and is incident on the optical antenna 21a of the intermediate station 21.

The intermediate station 21 determines the transmission angle of the optical signal 21c at which the intensity of the incident reflected light c1 is strongest, as the direction of the comparative station 23. The intermediate station 21 measures a round-trip propagation delay time by transmitting the optical signal 21c in the determined direction of the comparative station 23 and detecting the reflected light c1 of the optical signal 21c, and calculates a propagation delay time (propagation delay) τe that is half the round-trip propagation delay time.

The time tc based on the optical signal 21c that the optical antenna 23a of the comparative station 23 has received from the intermediate station 21 is delayed by the propagation delay time τe between the intermediate station 21 and the comparative station 23, which is represented as tc+τa in FIG. 8.

The signal control unit 23c of the comparative station 23 inputs, to TIC 23d, the time tb of the clock 23b. The TIC 23d subtracts, from the time tb, the time tc of the intermediate station 21 to calculate the time difference tb−tc between the time tb and the time tc. The time difference tb−tc is transmitted from the communication unit 23e to the server 24. In FIG. 1, the time difference tb−tc is represented as ta−(tc+τe) in consideration of the propagation delay τe for the time tc.

The server 24 inputs, to the difference calculation unit 25, the information of the time difference ta−tc and the time difference tb−tc received from the comparative stations 22 and 23, respectively, and the corresponding propagation delays τa and τe between the intermediate station 21 and each of the comparative stations 22 and 23.

The difference calculation unit 25 subtracts, from ta−(tc+τa), which is a value obtained by taking the propagation delay τa into consideration with respect to the time difference related to the comparative station 22, tb−(tc+τe), which is a value obtained by taking the propagation delay τe into consideration with respect to the time difference related to the comparative station 23. In other words, the difference calculation unit 25 calculates {ta−(tc+τa)}−{tb−(tc+τe)} to determine ta−tb+(τe−τa). (τe−τa) is a known value, and thus the difference calculation unit 25 cancel (τe−τa) with the same (τe−τa) to determine a time difference Δt=ta−tb between the comparative station 22 and the comparative station 23.

Instead of the reflector 32 described above, a relay station may be provided to receive the optical signal 21c from the intermediate station 21, perform amplifying or the like on the optical signal 21c, and relay the optical signal 21c to the comparative station 22. This relay station relays the reflected light c1 from the comparative station 22 to the intermediate station 21.

In addition, a specific configuration can be appropriately changed without departing from the gist of the present disclosure.

REFERENCE SIGNS LIST 20, 20A Time comparison system
21 Intermediate station
21a, 22a, 23a Optical antenna
21b, 22b, 23b Clock
21d LD
21e, 21m, 22k Lens
21f Optical complex amplitude modulation unit
21g, 22c, 23c Signal control unit
21h Propagation delay measuring unit
21i, 22e, 23e Communication unit
21j Optical complex amplitude control unit
21k, 22i Beam splitter
21n, 22m PD
22, 23, 29 Comparative station
22d, 23d TIC, Time interval measurement unit
22j Retroreflector
24 Server
25 Difference calculation unit
26 DCN
31 Obstacle
32 Reflector

The invention claimed is:

1. A time comparison system for determining a time difference between clocks each provided in one of a plurality of comparative stations apart from each other, wherein
the time comparison system comprises an intermediate station, the intermediate station including a clock and an optical antenna configured to transmit, to the plurality of comparative stations, an optical signal on which a time of the clock is superimposed and to receive reflected light of the optical signal,
each of the plurality of comparative stations includes an optical antenna configured to transmit and receive an optical signal, a reflection unit, including one or more processors, configured to reflect, in a direction of the intermediate station, an optical signal from the intermediate station received by the optical antenna, and a measurement unit, including one or more processors, configured to determine a time difference between a time of the clock of the comparative station and the time superimposed on the optical signal from the intermediate station,
the intermediate station includes an intermediate function unit, including one or more processors, configured to transmit, to the plurality of comparative stations, the optical signal on which the time associated with the intermediate station is superimposed, while changing a transmission angle of the optical signal, detect a peak intensity of reflected light generated due to reflection of the transmitted optical signal on the reflection unit to determine a direction of each of the plurality of comparative stations, determine a propagation delay time between each of the plurality of comparative stations, of which the direction is determined, and the intermediate station, and simultaneously transmit an optical signal to the plurality of comparative stations at the transmission angle determined for each of the plurality of comparative stations, and the time comparison system comprises a difference calculation unit, including one or more processors, configured to determine time information of each of the plurality of comparative stations by calculating a sum of the time difference between the time associated with the comparative station and the time associated with the intermediate station, that is determined by the measurement unit, and the propagation delay time determined by the intermediate function unit, and cancel, with the known propagation delay time, a propagation delay time included in a result of subtracting, from time information of one of the plurality of comparative stations, time information of another of the plurality of comparative stations, to determine a time difference between the plurality of comparative stations.

2. The time comparison system according to claim 1, wherein the intermediate function unit includes a laser unit, including one or more processors, configured to emit a laser beam on which the time of the clock of the intermediate station is superimposed, a modulation unit, including one or more processors, configured to perform optical complex amplitude modulation on the laser beam to disperse spots of the laser beam in a spatial region, transmit, to the plurality of comparative stations, the optical signal subjected to the optical complex amplitude modulation, and change the transmission angle of the optical signal by performing phase modulation, during the optical complex amplitude modulation, on the laser beam, a control unit, including one or more processors, configured to perform intensity scanning for the reflected light generated due to reflection of the optical signal transmitted while changing a transmission angle on the reflection unit, detect a peak intensity to determine the direction of each of the plurality of comparative stations, and store the transmission angle of the optical signal at which the peak intensity is detected, in association with comparative station identification information unique to each of the plurality of comparative stations to which the optical signal is transmitted, and a measuring unit, including one or more processors, configured to determine the propagation delay time between the intermediate station and each of the plurality of comparative stations, the propagation delay time being obtained by dividing, by 2, a round-trip propagation delay time from the time of transmission of the optical signal to the time of detection of the reflected light generated due to reflection of the optical signal on the reflection unit in each of the plurality of comparative stations, and the control unit is configured to control the modulation unit to transmit the optical signal at a transmission angle according to the stored comparative station identification information, and the measuring unit is configured to determine the propagation delay time based on the round-trip propagation delay time obtained during the control.

3. The time comparison system according to claim 1, wherein the reflection unit is a retroreflector configured to return an incident optical signal parallel to the incident direction.

4. The time comparison system according to claim 1, further comprising a reflector configured to reflect and transmit, to the comparative station, an optical signal transmitted from the intermediate station, when there is an obstacle blocking the optical signal, between the intermediate station and the comparative station.

5. The time comparison system according to claim 1, further comprising a relay station configured to relay, to the comparative station, an optical signal transmitted from the intermediate station, when there is an obstacle blocking the optical signal, between the intermediate station and the comparative station.

6. The time comparison system according to claim 1, wherein the intermediate station further includes an actuator configured to horizontally and vertically rotate the optical antenna of the intermediate station.

7. A time comparison apparatus for determining a time difference between clocks each provided in one of a plurality of comparative function units apart from each other, wherein the time comparison apparatus comprises an intermediate function unit, the intermediate function unit including a clock and an optical antenna configured to transmit, to the plurality of comparative function units, an optical signal on which a time of the clock is superimposed and to receive reflected light of the optical signal, each of the plurality of comparative function units includes an optical antenna configured to transmit and receive an optical signal, a reflection unit, including one or more processors, configured to reflect, in a direction of the intermediate function unit, an optical signal from the intermediate function unit received by the optical antenna, and a measurement unit, including one or more processors, configured to determine a time difference between a time of the clock of the comparative function unit and the time superimposed on the optical signal from the intermediate function unit, the intermediate function unit has functions of transmitting, to the plurality of comparative function units, the optical signal on which the time associated with the intermediate function unit is superimposed, while changing a transmission angle of the optical signal, detecting a peak intensity of reflected light generated due to reflection of the transmitted optical signal on the reflection unit to determine a direction of each of the plurality of comparative function units, determining a propagation delay time between each of the plurality of comparative function units, of which the direction is determined, and the intermediate function unit, and simultaneously transmitting an optical signal to the plurality of comparative function units at the transmission angle determined for each of the plurality of comparative function units, and the time comparison apparatus comprises a difference calculation unit, including one or more processors, configured to determine time information of each of the plurality of comparative function units by calculating a sum of the time difference between the time associated with the comparative function unit and the time associated with the intermediate function unit, that is determined by the measurement unit, and the propagation delay time determined by the intermediate function unit, and cancel, with the known propagation delay time, a propagation delay time included in a result of subtracting, from time information of one of the plurality of comparative function units, time information of another of the plurality of comparative function units, to determine a time difference between the plurality of comparative function units.

8. The time comparison apparatus according to claim 7, wherein
the intermediate function unit includes
a laser unit, including one or more processors, configured to emit a laser beam on which the time of the clock of the intermediate function unit is superimposed,
a modulation unit, including one or more processors, configured to perform optical complex amplitude modulation on the laser beam to disperse spots of the laser beam in a spatial region, transmit, to the plurality of comparative function units, the optical signal subjected to the optical complex amplitude modulation, and change the transmission angle of the optical signal by performing phase modulation, during the optical complex amplitude modulation, on the laser beam,
a control unit, including one or more processors, configured to perform intensity scanning for the reflected light generated due to reflection of the optical signal transmitted while changing a transmission angle on the reflection unit, detect a peak intensity to determine the direction of each of the plurality of comparative function units, and store the transmission angle of the optical signal at which the peak intensity is detected, in association with comparative station identification information unique to each of the plurality of comparative function units to which the optical signal is transmitted, and
a measuring unit, including one or more processors, configured to determine the propagation delay time between the intermediate function unit and each of the plurality of comparative function units, the propagation delay time being obtained by dividing, by 2, a round-trip propagation delay time from the time of transmission of the optical signal to the time of detection of the reflected light generated due to reflection of the optical signal on the reflection unit in each of the plurality of comparative function units, and
the control unit is configured to control the modulation unit to transmit the optical signal at a transmission angle according to the stored comparative station identification information, and the measuring unit is configured to determine the propagation delay time based on the round-trip propagation delay time obtained during the control.

9. The time comparison apparatus according to claim 7, wherein
the reflection unit is a retroreflector configured to return an incident optical signal parallel to the incident direction.

10. The time comparison apparatus according to claim 7, further comprising a reflector configured to reflect and transmit, to the comparative function unit, an optical signal transmitted from the intermediate function unit, when there is an obstacle blocking the optical signal, between the intermediate function unit and the comparative function unit.

11. The time comparison apparatus according to claim 7, further comprising a relay station configured to relay, to the comparative function unit, an optical signal transmitted from the intermediate function unit, when there is an obstacle blocking the optical signal, between the intermediate function unit and the comparative function unit.

12. The time comparison apparatus according to claim 7, wherein
the intermediate function unit further includes an actuator configured to horizontally and vertically rotate the optical antenna of the intermediate function unit.

13. A time comparison method in a time comparison system for determining a time difference between clocks each provided in one of a plurality of comparative stations apart from each other, wherein
the time comparison system includes an intermediate station, the intermediate station including a clock and an optical antenna configured to transmit, to the plurality of comparative stations, an optical signal on which a time of the clock is superimposed and to receive reflected light of the optical signal,
each of the plurality of comparative stations includes an optical antenna configured to transmit and receive an optical signal, a reflection unit, including one or more processors, configured to reflect, in a direction of the intermediate station, an optical signal from the intermediate station received by the optical antenna, and a measurement unit, including one or more processors, configured to determine a time difference between a time of the clock of the comparative station and the time superimposed on the optical signal from the intermediate station,
the time comparison system further includes a difference calculation unit, including one or more processors, configured to determine a time difference between the plurality of comparative stations, and
the method comprises,
at the intermediate station:
transmitting, to the plurality of comparative stations, the optical signal on which the time associated with the intermediate station is superimposed, while changing a transmission angle of the optical signal,
detecting a peak intensity of reflected light generated due to reflection of the transmitted optical signal on the reflection unit to determine a direction of each of the plurality of comparative stations,
determining a propagation delay time between each of the plurality of comparative stations, of which the direction is determined, and the intermediate station, and
simultaneously transmitting an optical signal to the plurality of comparative stations at the transmission angle determined for each of the plurality of comparative stations, and
at the difference calculation unit:
determining time information of each of the plurality of comparative stations by calculating a sum of the time difference between the time associated with the comparative station and the time associated with the intermediate station, that is determined by the measurement unit, and the determined propagation delay time, and
canceling, with the known propagation delay time, a propagation delay time included in a result of subtracting, from time information of one of the plurality of comparative stations, time information of another of the plurality of comparative stations, to determine a time difference between the plurality of comparative stations.

14. The time comparison method according to claim 13, further comprising:
at the intermediate station:
emitting a laser beam on which the time of the clock of the intermediate station is superimposed,
performing optical complex amplitude modulation on the laser beam to disperse spots of the laser beam in a spatial region, transmitting, to the plurality of comparative stations, the optical signal subjected to the optical complex amplitude modulation, and changing the transmission angle of the optical signal by performing phase modulation, during the optical complex amplitude modulation, on the laser beam,
performing intensity scanning for the reflected light generated due to reflection of the optical signal transmitted while changing a transmission angle on the reflection unit, detecting a peak intensity to determine the direction of each of the plurality of comparative stations, and storing the transmission angle of the optical signal at which the peak intensity is detected, in association with comparative station identification information unique to each of the plurality of comparative stations to which the optical signal is transmitted, and
determining the propagation delay time between the intermediate station and each of the plurality of comparative stations, the propagation delay time being obtained by dividing, by 2, a round-trip propagation delay time from the time of transmission of the optical signal to the time of detection of the reflected light generated due to reflection of the optical signal on the reflection unit in each of the plurality of comparative stations, and
transmitting the optical signal at a transmission angle according to the stored comparative station identification information, and determining the propagation delay time based on the round-trip propagation delay time obtained.

15. The time comparison method according to claim 13, wherein
the reflection unit is a retroreflector configured to return an incident optical signal parallel to the incident direction.

16. The time comparison method according to claim 13, wherein the time comparison system further comprises a reflector configured to reflect and transmit, to the comparative station, an optical signal transmitted from the intermediate station, when there is an obstacle blocking the optical signal, between the intermediate station and the comparative station.

17. The time comparison method according to claim 13, wherein the time comparison system further comprises a relay station configured to relay, to the comparative station, an optical signal transmitted from the intermediate station, when there is an obstacle blocking the optical signal, between the intermediate station and the comparative station.

18. The time comparison method according to claim 13, wherein
the intermediate station further includes an actuator configured to horizontally and vertically rotate the optical antenna of the intermediate station.

* * * * *